(12) United States Patent
Du et al.

(10) Patent No.: US 9,117,650 B2
(45) Date of Patent: Aug. 25, 2015

(54) FLUORESCENT LAMP WITH HIGH COLOR RENDERING INDEX AND COATING SYSTEMS THEREFOR

(71) Applicant: GENERAL ELECTRIC COMPANY, Schenectady, NY (US)

(72) Inventors: Fangming Du, Northfield, OH (US); Brett R. Bradley, Maple Heights, OH (US); William Erwin Cohen, Solon, OH (US); Nathaniel Jon Farkas, North Ridgeville, OH (US); Clark David Nelson, East Cleveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/315,904

(22) Filed: Jun. 26, 2014

(65) Prior Publication Data
US 2014/0306598 A1 Oct. 16, 2014

Related U.S. Application Data

(63) Continuation-in-part of application No. 13/247,350, filed on Sep. 28, 2011.

(51) Int. Cl.
*H01J 1/62* (2006.01)
*H01J 63/04* (2006.01)
*H01J 61/44* (2006.01)
*C09K 11/71* (2006.01)
*C09K 11/77* (2006.01)
*C09K 11/76* (2006.01)
*H01J 61/35* (2006.01)

(52) U.S. Cl.
CPC ............... *H01J 61/44* (2013.01); *C09K 11/71* (2013.01); *C09K 11/76* (2013.01); *C09K 11/7734* (2013.01); *H01J 61/35* (2013.01)

(58) Field of Classification Search
CPC ............ H01J 61/44; H01J 61/48; H01J 61/72; H01J 1/63; H01J 61/35; H01J 61/16; H01J 29/20; C09K 11/73; C09K 11/7734; C09K 11/7777; C09K 11/7786; C09K 11/7739; C09K 11/7787; C09K 11/595; C09K 11/663; C09K 11/701; C09K 11/778; C09K 11/71; C09K 11/7478; C09K 11/76; C09K 11/7774
USPC .......... 313/484, 485, 486, 487, 499, 635, 637, 313/639, 640; 252/301.4 R, 301.6 P, 301.35
See application file for complete search history.

(56) References Cited

U.S. PATENT DOCUMENTS 5,602,444 A 2/1997 Jansma
6,137,217 A 10/2000 Pappalardo
(Continued)

FOREIGN PATENT DOCUMENTS

WO 2008055769 A2 5/2008

OTHER PUBLICATIONS

Non-Final Rejection towards related U.S. Appl. No. 13/247,350 dated Aug. 22, 2014.

*Primary Examiner* — Thomas A Hollweg
*Assistant Examiner* — Kevin Quarterman
(74) *Attorney, Agent, or Firm* — GE Global Patent Operation; Peter T. DiMauro

(57) ABSTRACT

A coating system for a fluorescent lamp, and fluorescent lamps provided therewith. The coating system includes a phosphor-containing coating containing a mixture of phosphors that contain less than 10% weight rare earth phosphors. The phosphor-containing coating emits visible light having a color rendering index of at least 87 when excited by UV radiation.

17 Claims, 1 Drawing Sheet

(56) References Cited

U.S. PATENT DOCUMENTS

| | | |
|---|---|---|
| 6,525,460 B1 | 2/2003 | Soules et al. |
| 6,525,560 B1 | 2/2003 | Trimberger et al. |
| 7,119,488 B2 | 10/2006 | Soules |
| 2003/0155857 A1* | 8/2003 | Soules et al. .................. 313/487 |
| 2004/0113538 A1* | 6/2004 | Srivastava et al. ............ 313/486 |
| 2007/0170834 A1* | 7/2007 | Jansma .......................... 313/487 |
| 2009/0102348 A1* | 4/2009 | Beers et al. ................... 313/487 |
| 2009/0213584 A1 | 8/2009 | Jansma |
| 2013/0076227 A1* | 3/2013 | Cohen et al. .................. 313/486 |
| 2013/0076228 A1 | 3/2013 | Du |

\* cited by examiner

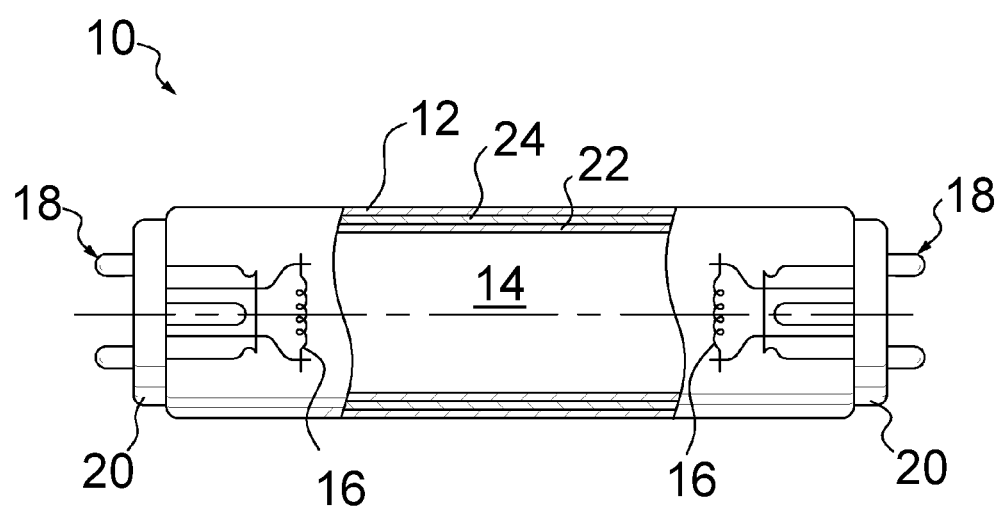

FLUORESCENT LAMP WITH HIGH COLOR RENDERING INDEX AND COATING SYSTEMS THEREFOR

CROSS REFERENCE TO RELATED APPLICATIONS

This is a continuation-in-part patent application of copending U.S. patent application Ser. No. 13/247,350, filed Sep. 28, 2011. The contents of this prior application are incorporated herein by reference.

BACKGROUND OF THE INVENTION

The present invention generally relates to lighting systems and related technologies. More particularly, this invention relates to fluorescent lamps and coating systems utilized by fluorescent lamps to generate visible light.

Fluorescent lamps have been in use and commercialization since the 1930s. More recently, both consumers and producers have voiced increased concerns for energy efficiency and environmental impact of products, spanning all industries, including the lighting industry. As such, fluorescent lights have seen an increase in usage due to their increased energy efficiency when compared to conventional incandescent lights. Fluorescent lights see a great deal of competition from light-emitting diode (LED) lights, due to a potential for greater efficiency and luminosity of LEDs. Significant effort and research have been made in the interest of improving fluorescent light lumen output without increasing power requirements or significantly increasing material costs.

A nonlimiting example of a fluorescent lamp 10 is schematically represented in FIG. 1. The lamp 10 is represented as having a sealed glass tube comprising of a glass envelope or shell 12 enclosing an interior chamber 14. The chamber 14 is preferably at very low pressure, for example, around 0.3% atmospheric pressure, and contains a gas mixture having at least one constituent that can be ionized to generate radiation that includes ultraviolet (UV) wavelengths. According to the current state of the art, such a gas mixture includes one or more inert gases (for example, argon) or a mixture of one or more inert gases and other gases at a low pressure, along with a small quantity of mercury vapor. Electrodes 16 inside the chamber 14 are electrically connected to electrical contact pins 18 that extend from oppositely-disposed bases 20 of the lamp 10. When the contact pins 18 are connected to a power source, the applied voltage causes current to flow through the electrodes 16 and electrons to migrate from one electrode 16 to the other electrode 16 at the other end of the chamber 14. In the process, this energy converts a small amount of the liquid mercury from the liquid state to a charged (ionized) gaseous (vapor) state. The electrons and charged gas molecules move through the chamber 14, occasionally colliding with and exciting the gaseous mercury molecules, raising the energy level of the electrons in the mercury atoms. In order to return to their original energy level, the electrons release photons.

Due to the arrangement of electrons in mercury atoms, most of the photons released by these electrons are in the ultraviolet (UV) wavelengths. This is not visible light, and as such for the lamp 10 to emit visible light these photons must be converted to a visible light wavelength. Such a conversion can be performed by a coating 22 represented in FIG. 1 as disposed at the interior surface of the glass shell 12. The coating 22 contains phosphor powders and is often separated from the glass shell 12 by a UV-reflecting barrier layer 24 of, for example, alumina ($Al_2O_3$). The UV radiation emitted by the ionized mercury vapor is absorbed by the phosphor composition within the coating 22, resulting in excitation of the phosphor composition to produce visible light that is emitted through the glass shell 12. More particularly, when electrons of the phosphor atoms are struck by photons, the electrons become excited to a higher energy level and emit a photon to return to their original energy level. The emitted photon has less energy than the impinging photon and is in the visible light spectrum to provide the lighting function of the lamp 10. The color and luminosity of the lamp 10 are largely the result of the phosphor or phosphors used in the coating 22.

The apparent, or perceived, color of a light source can be described in terms of color temperature, which is the temperature of a black body that emits radiation of about the same chromaticity as the radiation considered. A light source having a color temperature of 3000K has a larger red component than a light source having a color temperature of 4100K. As additional examples, a fluorescent lamp having a perceived "warm white" color may have a CCT of approximately 3000K, whereas a fluorescent lamp having a perceived "cool white" color may have a CCT of approximately 4000K. Another measure of fluorescent lamp performance is the color rendering index (CRI). The CRI of a light source does not indicate the apparent color of the light source, but instead is a quantitative measure of the ability of a light source to reproduce the colors of objects faithfully in comparison with an ideal or natural light source. CRIs can only be accurately compared among two light sources having the same CCT. The highest possible numeric CRI value is 100. Incandescent lamps, which are essentially blackbodies, have CRIs of 100. Typical LEDs have CRIs of 80 or more, with CRIs of up to 98 being claimed, whereas fluorescent lamps typically have CRIs in a range of about 50 to about 90. In this regard, a high CRI for fluorescent lamps can be considered to be about 80 and higher, particularly at least 87.

Because fluorescent lamps utilize phosphors to produce visible light, the CRI and CCT of a fluorescent lamp is strongly influenced by the particular amounts of phosphors used and their compositions. Significant improvements in the CRIs of fluorescent lamps have been achieved with rare earth phosphors, in particular, phosphors containing one or more rare earth elements generally considered to include the fifteen lanthanides, scandium, and yttrium. Though fairly abundant, rare earth elements are becoming increasingly prohibitive to procure due to the majority of known rare earth reserves being found in limited locations, and the need to separate individual rare earth elements or compounds from relatively low concentrations found in various mined compounds. In addition, demand for rare earth elements has increased in a wide variety of technologies, for example, medical technologies, wind turbines, hybrid automobiles, televisions, smart phones, and computers. As such, the use of rare earth elements in phosphor coatings of fluorescent lamps has or may become increasingly cost-prohibitive, and effective alternative solutions are being sought. However, suitable alternatives preferably should not detrimentally affect the CRI or CCT of a fluorescent lamp.

BRIEF DESCRIPTION OF THE INVENTION

The present invention provides phosphor compositions suitable for use in fluorescent lamps to produce visible light, and to lamps utilizing such phosphor compositions.

According to a first aspect of the invention, a coating system comprises a phosphor-containing coating containing a mixture of phosphors. The mixture of phosphors contains less than 10% weight rare earth phosphors, and the phosphor-containing coating emits visible light having a color rendering index of at least 87 when excited by UV radiation.

Other aspects of the invention include fluorescent lamps having coating systems comprising the composition and characteristics described above.

A technical effect of the invention is the ability of a fluorescent lamp equipped with the phosphor-containing coating to exhibit a high color rendering index (CRI) with very limited use of rare earth phosphors. The phosphor-containing coating is particularly well-suited for use in fluorescent lamps that are desired to have CCTs at a value within a range of about 3000K to about 4100K. Such fluorescent lamps have the capability of exhibiting desirable lighting characteristics while minimizing certain disadvantageous aspects relating to the use of rare earth elements.

Other aspects and advantages of this invention will be better appreciated from the following detailed description.

BRIEF DESCRIPTION OF THE DRAWINGS

FIG. 1 represents a fluorescent lamp, including a fragmentary cross-sectional view of a glass tube of the lamp and an inner surface of the tube provided with a UV-reflecting coating and phosphor-containing coating.

DETAILED DESCRIPTION OF THE INVENTION

The invention will be described hereinafter in reference to the lamp 10 shown in FIG. 1, though it will be appreciated that the teachings of the invention are not limited to the lamp 10 and instead are more generally applicable to various lighting applications in which visible light is generated with the use of phosphor compounds, such as non-linear fluorescent lamps, or compact fluorescent lamps (CFLs), or other types of lamps.

The invention relates to coating systems that include a phosphor-containing coating, such as the single phosphor-containing coating 22 of FIG. 1, applied to a transparent or translucent substrate, such as the glass shell or envelope 12 of the fluorescent lamp 10. In the nonlimiting example of FIG. 1, a discrete UV-reflecting layer 24 is represented as a constituent of a coating system that includes the phosphor-containing coating 22. The UV-reflecting layer 24 may contain a scattering agent selected on the basis of its ability to scatter incoming UV rays emitted from an ionized constituent (for example, mercury) within the chamber 14 of the lamp 10. The scattered UV rays are then absorbed by the adjacent phosphor-containing coating 22, which as a result emits visible light.

According to an aspect of the invention, the phosphor-containing coating 22 has a composition that enables the lamp 10 to have a CRI of at least 87, and preferably to emit visible light emitted having a CCT at a value in a range of about 3000K to about 4100K, for example, at 3000K, 3500K, or 4100K. In addition, rare earth-containing phosphors constitute not more than about 10 weight percent of the phosphor content of the coating 22, with the balance of the phosphor content being non-rare earth phosphors, of which at least one is at least one white halophosphor.

A preferred aspect of the invention is the capability of improving fluorescent lamp lumen output without significantly lowering CRI through the use of a white halophosphor. According to a preferred but nonlimiting embodiment of the invention, the entire phosphor content of the phosphor-containing coating 22 is a mixture of phosphors consisting of at least one white halophosphor, at least one strontium red phosphor, at least one blue halophosphor, and at least one green-blue emitting rare earth phosphor. The strontium red phosphor and the blue and white halophosphors are "non-RE" phosphors having broadband emitting distribution, which are believed to significantly improve lamp CRI. The green-blue emitting rare earth (RE) phosphor represents a relatively small fraction (not more than 10 weight percent) of the phosphor mixture, yet is preferably present in an amount capable of promoting the CRI of the coating 22 while also obtaining a color temperature consistent with the aforementioned CCT range.

Various phosphors that can be employed by the invention are commercially manufactured and available. The processes for manufacturing and introducing these phosphors into a phosphor mix are known to those skilled in the art, and therefore do not require further discussion here. A nonlimiting list of notable phosphors that are suitable for use in this invention is found in Table 1.

TABLE 1

| Type | Name | Formula |
|---|---|---|
| Non-RE strontium red phosphor | SR | $Sr_3(PO_4)_2:Sn^{2+}$ |
| Non-RE blue halophosphor | Blue Halo | $Ca_5F(PO_4)_3:Sb$ |
| Non-RE white halophosphor | White Halo | $Ca_5(PO_4)_3(F,Cl):Sb^{3+},Mn^{2+}$ |
| RE green-blue phosphor | BAMn | $BaMgAl_{10}O_{17}:Eu^{2+},Mn^{2+}$ |
| RE green-blue phosphor | SAE | $Sr_4Al_{14}O_{25}:Eu^{2+}$ |

In investigations leading to the present invention, evaluations performed on phosphor mixtures confirmed that appropriate additions of a white halophosphor to phosphor mixtures containing a strontium red phosphor, a blue halophosphor, and a green-blue emitting rare earth phosphor were capable of improving lamp lumen output while maintaining nearly the same performance in CRI. In Table 2 below, relative amounts (by weight percent) of $Ca_5(PO_4)_3(F,Cl):Sb^{3+},Mn^{2+}$ as the white halophosphor (White Halo) are indicated in relation to a phosphor mixture containing, respectively, about 72%, about 22%, and about 6% (by weight) of $Sr_3(PO_4)_2:Sn^{2+}$, $Ca_5F(PO_4)_3:Sb$, and $BaMgAl_{10}O_{17}:Eu^{2+},Mn^{2+}$ as the strontium red (SR) phosphor, blue halophosphor (Blue Halo), and green-blue emitting rare earth phosphor (BAMn) (respectively).

TABLE 2

| | Phosphor Mixtures | | Lamp Performance | |
|---|---|---|---|---|
| Sample | SR-BAMn-BlueHalo | White Halo | CRI | Lumen % |
| A | 100% | 0% | 90.6 | 100 |
| B | 90% | 10% | 88.9 | 103 |
| C | 85% | 15% | 87.6 | 106 |

The test data indicate that increasing the proportion of white halophosphor within the phosphor mixture improved lumen output without significantly reducing lamp CRI. Such a capability enables a lamp to achieve improved lumen performance while reducing the amount of rare earth phosphor(s) within the mixture and without negatively affecting the apparent or perceived color (described in terms of color temperature) of the light. In the particular examples evaluated during the investigation, an addition of 15 weight percent white halophosphor increased lumen output by about 6% while CRI was reduced by only 3 points, while still meeting standards for assessing light sources for suitability of use in a wide variety of applications, including retail, residential, hospitality, etc.

In addition to Samples B and C of Table 2, based on the results of the investigation it was concluded that a lamp utilizing a phosphor mixture of strontium red, blue halophosphor, and green-blue rare earth phosphor and modified to contain a white halophosphor should be capable of exhibiting improved CRI as compared to lamps that only utilize the same or similar tri-phosphor mixture of strontium red, blue halophosphor, and green-blue rare earth phosphor. The relative amounts of each phosphor component in phosphor mixtures of this invention include (but are not limited to), by weight, about 55% to about 90% and more preferably about 65% to about 80% of a strontium red (non-RE) phosphor, from about 10% to about 30% and more preferably about 15% to about 25% of a blue (non-RE) halophosphor, above 0% to about 20% and more preferably about 5% to about 15% of a white (non-RE) halophosphor, and about 0% to about 10% and more preferably about 4% to about 8% of a green-blue rare earth phosphor.

While the invention has been described in terms of specific embodiments, it is apparent that other forms could be adopted by one skilled in the art. For example, the physical configuration of a lamp could differ from that shown, and materials and processes other than those noted could be used. Therefore, the scope of the invention is to be limited only by the following claims.

The invention claimed is:

1. A coating system comprising a phosphor-containing coating containing phosphors, the phosphors within the phosphor-containing coating consisting of a mixture of phosphors that comprise at least one non-rare-earth blue halophosphor and at least one white halophosphor, wherein rare earth-containing phosphors constitute not more than about 10 weight percent of the phosphor content of the coating, the phosphor-containing coating emitting visible light having a color rendering index of at least 87 when excited by UV radiation;
   wherein the visible light has a CCT at a value within a range of about 3000 K to about 4100 K.

2. The coating system according to claim 1, wherein the mixture of phosphors contains above 0 to about 20 weight percent of the at least one white halophosphor.

3. The coating system according to claim 1, wherein the mixture of phosphors further comprises at least one strontium red phosphor.

4. The coating system according to claim 1, wherein the mixture of phosphors comprises at least one blue-green emitting rare earth phosphor.

5. The coating system according to claim 1, wherein the visible light emitted by the phosphor-containing coating has a CCT of about 3000 K.

6. The coating system according to claim 1, wherein the visible light emitted by the phosphor-containing coating has a CCT of about 3500 K.

7. The coating system according to claim 1, wherein the visible light emitted by the phosphor-containing coating has a CCT of about 4100 K.

8. The coating system according to claim 1, wherein the phosphor-containing coating consists of a single layer within the coating system and all phosphors within the coating system are within the phosphor-containing coating.

9. A fluorescent lamp having the coating system of claim 1.

10. The fluorescent lamp according to claim 9, wherein the mixture of phosphors contains about 5 to about 15 weight percent of the at least one white halophosphor.

11. The fluorescent lamp according to claim 9, wherein the mixture of phosphors further comprises at least one strontium red phosphor.

12. The fluorescent lamp according to claim 9, wherein the mixture of phosphors comprises at least one blue-green emitting rare earth phosphor.

13. The fluorescent lamp according to claim 9, wherein the visible light emitted by the fluorescent lamp has a CCT of about 3000 K.

14. The fluorescent lamp according to claim 9, wherein the visible light emitted by the fluorescent lamp has a CCT of about 3500 K.

15. The fluorescent lamp according to claim 9, wherein the visible light emitted by the fluorescent lamp has a CCT of about 4100 K.

16. The fluorescent lamp according to claim 9, wherein the phosphor-containing coating consists of a single layer within the coating system and all phosphors within the coating system are within the phosphor-containing coating.

17. A fluorescent lamp having a coating system that comprises a phosphor-containing coating containing phosphors, the phosphors within the phosphor-containing coating consisting of a mixture of phosphors that comprise at least one white halophosphor, at least one strontium red phosphor, at least one non-rare-earth blue halophosphor, wherein rare earth-containing phosphors constitute not more than about 10 weight percent of the phosphor content of the coating,
   the fluorescent lamp in operation emitting visible light having a color rendering index of at least 87,
   wherein the visible light emitted by the fluorescent lamp has a CCT at a value within a range of about 3000 K to about 4100 K.

* * * * *